United States Patent
Mittal et al.

(10) Patent No.: US 6,952,770 B1
(45) Date of Patent: Oct. 4, 2005

(54) METHOD AND APPARATUS FOR HARDWARE PLATFORM IDENTIFICATION WITH PRIVACY PROTECTION

(75) Inventors: Millind Mittal, Palo Alto, CA (US); James Mi, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/525,702

(22) Filed: Mar. 14, 2000

(51) Int. Cl.[7] .............................................. H04L 9/28
(52) U.S. Cl. ........................ 713/168; 713/189; 709/229
(58) Field of Search ................................ 713/168, 169, 713/200, 185, 201, 193, 189; 709/229

(56) References Cited

U.S. PATENT DOCUMENTS

| | | | | |
|---|---|---|---|---|
| 5,774,544 A | * | 6/1998 | Lee et al. | 713/189 |
| 5,790,783 A | * | 8/1998 | Lee et al. | 713/200 |
| 5,946,497 A | * | 8/1999 | Lee et al. | 712/37 |
| 6,243,468 B1 | * | 6/2001 | Pearce et al. | 380/255 |
| 6,334,189 B1 | * | 12/2001 | Granger et al. | 713/200 |
| 6,418,472 B1 | * | 7/2002 | Mi et al. | 709/229 |
| 6,460,076 B1 | * | 10/2002 | Srinivasan | 709/219 |
| 6,463,533 B1 | * | 10/2002 | Calamera et al. | 713/163 |
| 6,480,959 B1 | * | 11/2002 | Granger et al. | 713/189 |
| 6,560,651 B2 | * | 5/2003 | Katz et al. | 709/229 |
| 6,611,870 B1 | * | 8/2003 | Asano et al. | 709/238 |

OTHER PUBLICATIONS http://www.avault.com/news/displaynews.asp?story=1271999-182549.*
http://www.eetimes.com/story/OEG19990127S0011.*
Definition of Micromode , http://dict.die.net/microcode/.*

* cited by examiner

*Primary Examiner*—Gregory Morse
(74) *Attorney, Agent, or Firm*—Rob D. Anderson

(57) ABSTRACT

A method and apparatus for enabling hardware platform identification while ensuring privacy protection. The apparatus comprises a computer-readable medium that stores computer-executable instructions. Those instructions, when executed by a microprocessor, cause an expected hash value, which is derived from a key and a first identifier for a computer system; to be compared with a hash value, which is derived from the key and a second identifier for a computer system. A microprocessor for executing those instructions may comprise an identifier that identifies the microprocessor, and embedded instructions for comparing a hash value, derived from the identifier and a key, to an expected hash value.

2 Claims, 4 Drawing Sheets

METHOD AND APPARATUS FOR HARDWARE PLATFORM IDENTIFICATION WITH PRIVACY PROTECTION

FIELD OF THE INVENTION

The present invention relates to computer system identification. More specifically, the invention relates to a method and apparatus for identifying a computer system, while inhibiting the ability to track user communication with different web sites.

BACKGROUND OF THE INVENTION

A content provider that delivers encrypted content and a decryption program (such as from a web site) to computer systems may want to ensure that only authorized systems may execute that program. By including in the decryption program instructions that enable that program to identify the computer system that executes it, the program can determine whether that system is authorized to run the program. If the program determines that the system is not authorized, it can discontinue execution.

An embedded identifier stored within a computer system, such as a processor serial number (hereinafter described as a "processor number"), may provide an effective way for such a program to identify such a system—if the program can retrieve that identifier, e.g., via a ring 3 instruction. Such an instruction, however, exposes the same identifier each time a system chooses to identify itself. Although this may not be particularly significant when identifying a platform to a decryption program, providing access to such a platform identifier may enable tracking of a user's Internet activity, which could enable compilation of information that links the user to various web sites.

One way to impede collection of such information is to customize the identifier for each web site. For example, in response to an identification request, a computer system may return a hash value that is a function of a processor number and a key that is unique for each web site. See copending application Ser. No. 09/259,620, filed Feb. 26, 1999 and assigned to this application's assignee. As shown in FIG. 1, web sites 36a–c may provide unique keys 34a–c, respectively, which encryption unit 31 hashes with processor number 30, producing unique hash values 32a–c for identifying computer system 10 to each web site. As a result, each web site 36a–c may identify system 10 by a different hash value 32a–c, although each hash value is generated with a single processor number 30. Because each web site associates computer system 10 with a different hash value, information about a user of system 10 may not be correlated between databases that are maintained by different web sites.

To ensure that this safeguard is not circumvented by web sites 36a–c agreeing to use the same key, it may be desirable to require that each key correspond to an address or universal resource locator (URL) for each web site 36a–c. An URL based key may be reliably tied to a particular web site by making the instruction for accessing the hash value a ring 0 instruction. In response to a web site request for that hash value, the operating system can call a driver that has ring 0 privileges. The driver then causes the processor to validate the key, e.g., by checking it against the web site's URL—which may be retrieved from the browser. If the URL matches the key, then the processor executes instructions for hashing that key with the processor number and returns the resulting hash value to the web site. If the URL does not match the key, the web site's request is rejected.

Although making hash value retrieval a ring 0 operation ensures privacy for the user, a content provider may not be comfortable relying on such an operation to ensure that delivered encrypted content, and an accompanying decryption program, runs on authorized systems only. Because inter-privilege level calls may be intercepted by rogue software, a content provider may not wish to depend on a driver (ring 0) call for this function. Content providers may instead want the decryption program to be able to invoke a ring 3 instruction to verify the identity of the computer system that executes the program.

Accordingly, there is a need for a method and apparatus that enables an application's execution to be bound to authorized platforms, while still preserving user privacy. There is a need for such a method and apparatus that enables a decryption program to detect whether a computer system is authorized to execute that program—to ensure that delivered content is not copied for use by an unauthorized platform. There is a need for such a method and apparatus that enables such a program to periodically verify the identity of the platform upon which it is executed. The present invention provides such a method and apparatus.

SUMMARY OF THE INVENTION

A method and apparatus for enabling hardware platform identification while ensuring privacy protection is described. The apparatus comprises a computer-readable medium that stores computer-executable instructions. Those instructions, when executed by a microprocessor, cause an expected hash value, which is derived from a key and a first identifier for a computer system, to be compared with a hash value, which is derived from the key and a second identifier for a computer system. A microprocessor for executing those instructions may comprise an identifier that identifies the microprocessor, and embedded instructions for comparing a hash value, derived from the identifier and a key, to an expected hash value.

That microprocessor, and the computer-executable instructions, may be used in a method for confirming the identity of a computer system. Such a method may comprise receiving a request from an application (e.g., a decryption program) to confirm the identity of a computer system. That request may be accompanied by a key (e.g., a bit string corresponding to an URL for a web site) and an expected hash value derived from that key and a first identifier for a computer system. After a second identifier—for the computer system that executes the application—is retrieved, a hash value is generated, which is derived from the second identifier and the key. That hash value is then compared with the expected hash value. The result of that comparison may then be forwarded to the application.

The method and apparatus of the present invention enables a decryption program (or other application) to periodically verify the identity of a computer system during the program's execution to ensure that the system is authorized to execute that program. That identity check may be performed without having to expose a platform identifier (or hash of that identifier) to the program. This capability is thus provided without having to enable other applications to access a platform identifier, which could compromise user privacy.

DETAILED DESCRIPTION OF THE PRESENT INVENTION

A method and apparatus is described for comparing an expected hash value to a hash value derived from a computer system identifier and a key. In the following description, numerous specific details are set forth to provide a thorough understanding of the present invention. However, it will be apparent to those skilled in the art that the invention may be practiced in many ways other than those expressly described here. The invention is thus not limited by the specific details disclosed below.

The method and apparatus of the present invention enable an application (e.g., a decryption program) to confirm the identity of a computer system. This enables an application (e.g., a decryption program for decrypting encrypted video and/or audio containing content) to perform periodic checks on the identity of a platform executing that application. This, capability enables such an application to determine whether a program has been copied from an authorized system to an unauthorized system. In this respect, the method and apparatus of the present invention enable content that has been delivered to a computer system to be bound to that system.

To confirm the identity of a computer system, a microprocessor (a.k.a. processor) executes instructions for comparing an expected hash value, which may be derived from a key and a first identifier for a computer system, to a hash value derived from that key and a second identifier for a computer system. If the expected hash value matches the generated hash value, the microprocessor returns a "true" output. If the hash values do not match, a "false" output is returned.

In the context of this application, the phrase "computer system" may generally refer to a processor-based system. Such a system may include (but is not limited to) a server, a desktop computer, a mobile computer (a laptop or notebook computer, for example), a graphics system, a set-top box, a personal digital assistant, or a variety of hand held devices able to provide some type of computing function. The term "processor" may refer to, as examples, at least one central processing unit (CPU), microcontroller, X86 instruction based microprocessor (e.g., a microprocessor available from Intel Corporation under the Pentium® or Itanium® trade names, or a compatible microprocessor), Advanced RISC Machine (ARM) microprocessor or RISC processor. These examples are not intended to be limiting. Rather, other types of computer systems and other types of processors may be used in some embodiments of the invention. To generate the hash values referenced herein, many different hash functions may be used. For example, in some embodiments, a secure hash algorithm (SHA) may be used.

Figure 1:
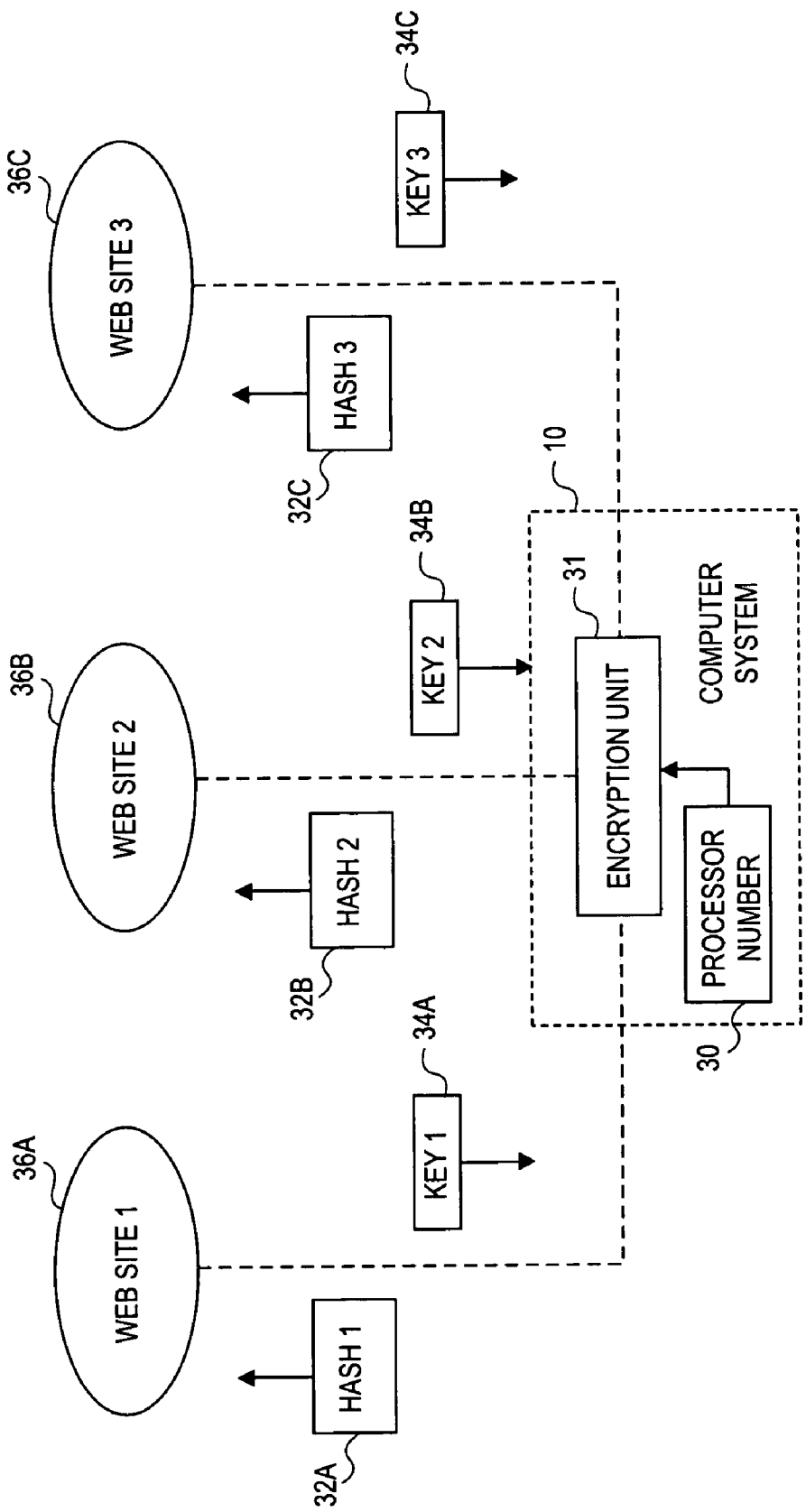
FIG. 1 is a block diagram of a network connecting a computer system to a number of web sites.
Figure 2:
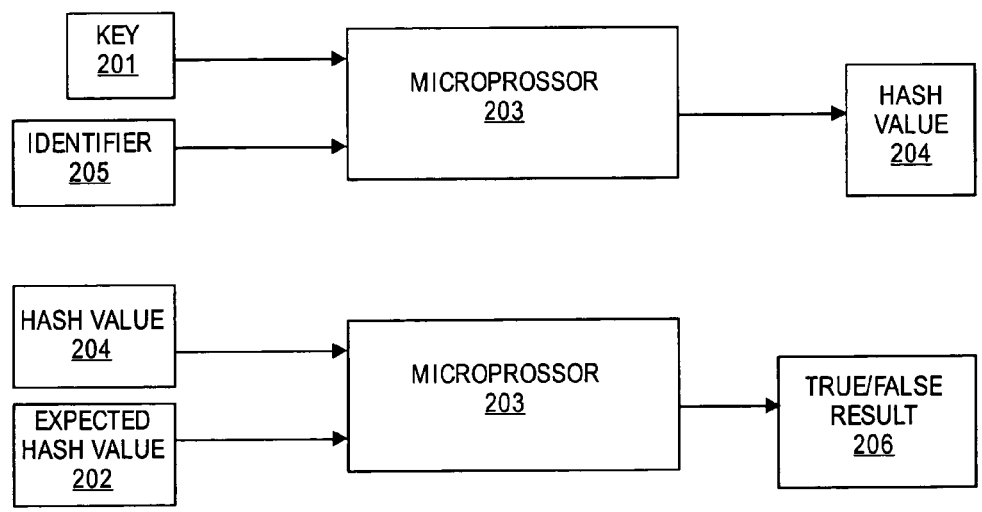
FIG. 2 is a block diagram illustrating the hash value comparison operation of the present invention.

As shown in FIG. 2, the hash value comparison function of the present invention may be accomplished as follows. In the context of binding an application to a particular platform, key 201 and expected hash value 202 are fed into microprocessor 203. Key 201 may comprise a unique bit string that corresponds to a web site address, or URL, for a web site that delivers content. Microprocessor 203 generates hash value 204 from key 201 and identifier 205. Microprocessor 203 then executes instructions that cause expected hash value 202 to be compared with generated hash value 204, outputting true/false result 206. If the hash values match, result 206 is true. If they do not match, result 206 is false.

Figure 3:
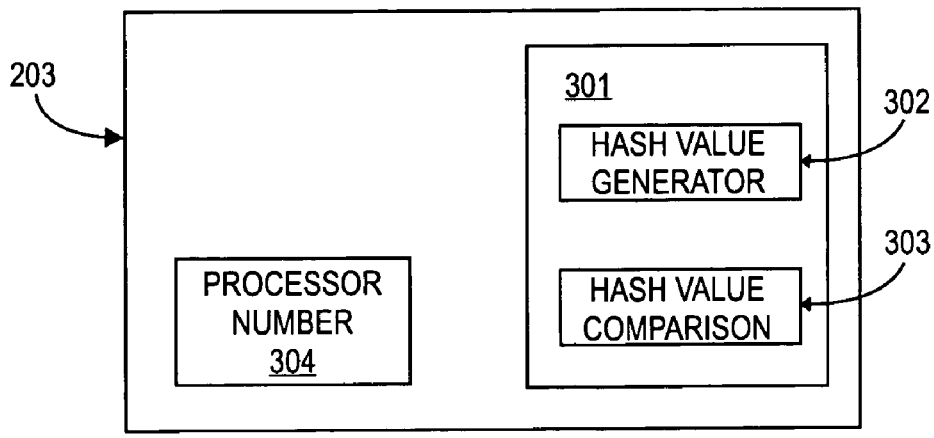
FIG. 3 is a block diagram of a microprocessor that may be used to perform the comparison operation illustrated in FIG. 2.

Microprocessor 203 is shown in more detail in FIG. 3. Microprocessor 203 includes embedded instructions that take the form of microcode, which are stored in microcode ROM 301. Other functional blocks contained within microprocessor 203 execute these microcoded instructions in response to appropriate commands, as is well known to those skilled in the art. In this embodiment of the present invention, microcode ROM 301 includes microcode routines 302 and 303. When executed, microcode routine 302 generates a hash value that is derived from processor number 304 (also stored in microprocessor 203, and which in this embodiment fills the role of identifier 205) and a key. Microcode routine 303, when executed, compares that generated hash value with an expected hash value, then returns the result of that comparison.

Figure 4:
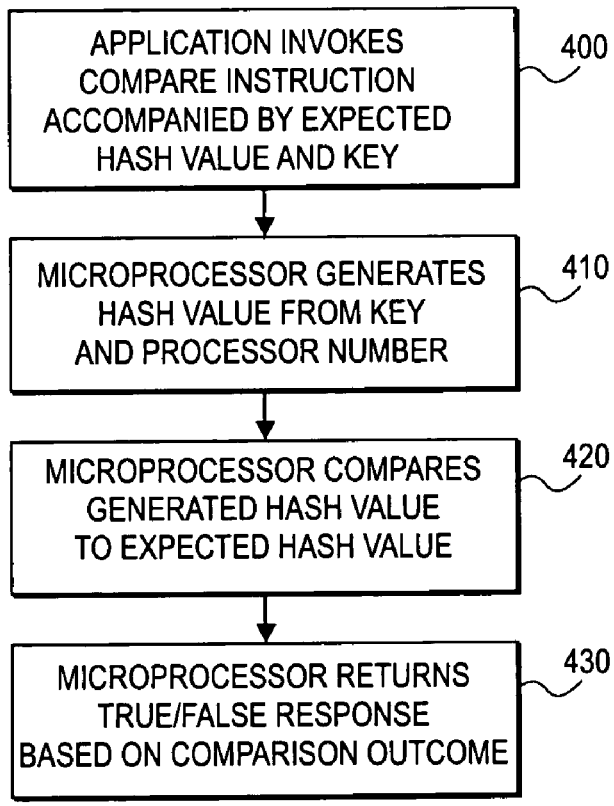
FIG. 4 is a flow chart illustrating an embodiment of the method of the present invention.

A preferred method of the present invention, as applied to an application (e.g., a decryption program for decrypting encrypted content) that is capable of verifying a computer system's identify, is illustrated by the flow chart shown in FIG. 4. In that method, an application wants to confirm the identity of a computer system. To do so, that application invokes a "compare" instruction that is accompanied by two data values, i.e., an expected hash value and a key (step 400). The expected hash value may be derived from a processor number stored on a computer system that is authorized to run the application and a bit string corresponding to an URL for a web site that delivered that application. The outcome of the "compare" instruction will determine whether the computer system that currently executes the application is identical to the computer system that is authorized to do so, e.g., the computer system to which encrypted content, and an accompanying decryption program, was initially delivered.

The computer system's microprocessor receives the request from the application to confirm the identity of the system. The microprocessor also receives the expected hash value and the key. The microprocessor then generates a hash value from the key and the processor number stored in the microprocessor (step 410). The microprocessor may perform that hashing operation by executing an appropriate microcode routine.

After the hash value has been generated, the microprocessor compares that value with the expected hash value (step 420), then returns a true/false response based on that comparison (step 430). If the hash values match, a true response is returned—indicating that the computer system currently executing the application is identical to the computer system that is authorized to execute the application (e.g., the computer system to which the application was initially delivered). If the hash values do not match, a false response is returned, notifying the application (e.g., decryption program) that the computer systems are not identical. In response to such a false response, the application can discontinue its execution.

The method and apparatus of the present invention enables an application to query a computer system's hardware to determine whether that system matches the computer system that is authorized to execute the application. Because the microprocessor returns a true/false answer in response to that request, neither the computer system's processor number, nor a hash value derived from it, is exposed when the application performs this identity check. As a consequence, such a system identifier need not be exposed to other applications, and user privacy is preserved.

The method and apparatus of the present invention thus provides a hardware feature that preserves consumer privacy protection while enabling an application to reliably verify the identity of a computer system. In a system that employs the present invention, an application that already knows the hash value corresponding to a particular computer system, i.e., the expected hash value referenced above, can validate that it has not been copied over to an unauthorized system. Such an application can be bound to a platform (e.g., one receiving the authorized delivery of encrypted content and an accompanying decryption program) by simply having the computer system's hardware compare an expected hash value with the hash value derived from a key and the system's processor number.

Figure 5:
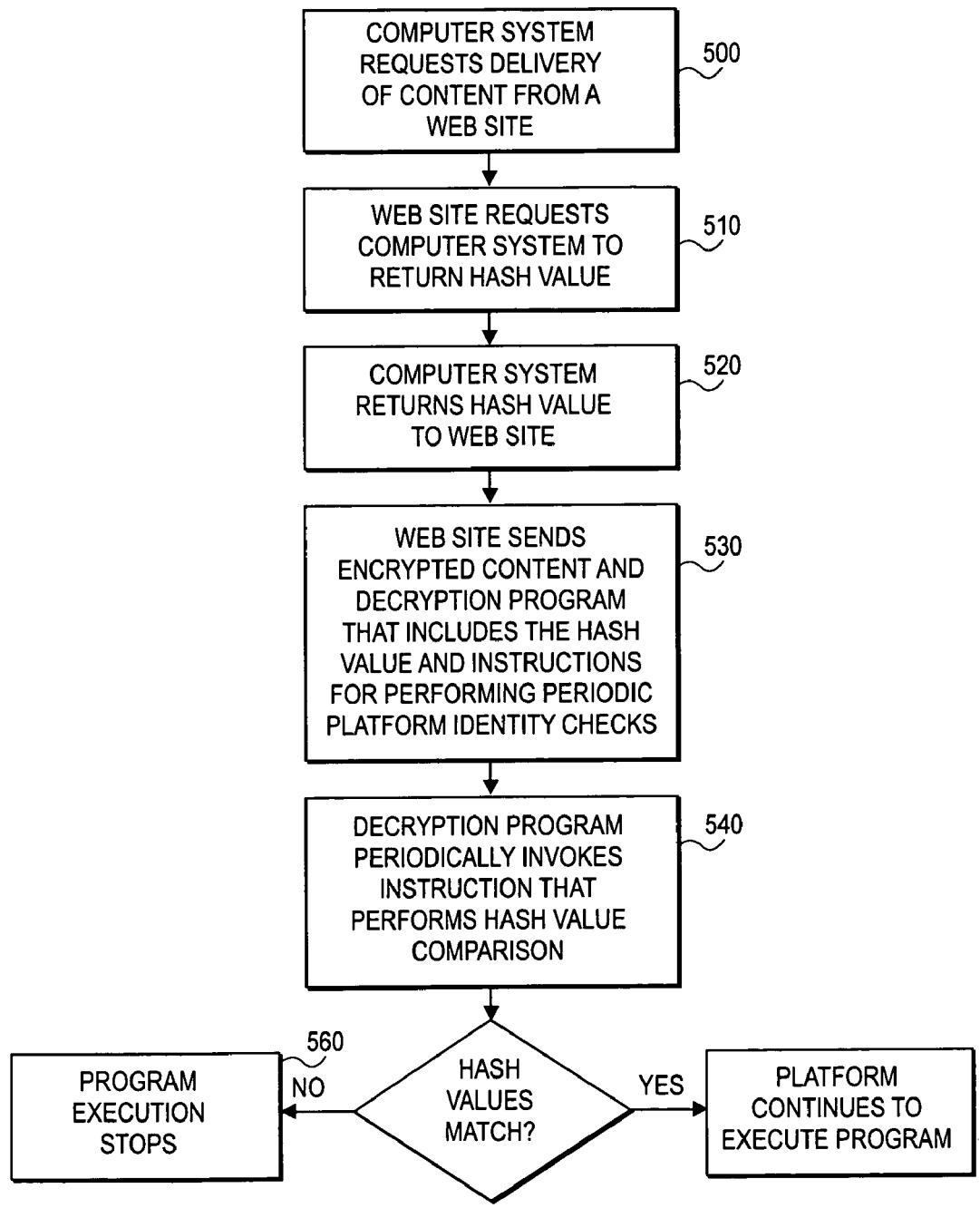
FIG. 5 is a flow chart illustrating another embodiment of the method of the present invention.

FIG. 5 provides a flow chart that illustrates how the method and apparatus of the present invention may be used to tie content, delivered from a web site, to a platform. A computer system requests the delivery of content from a web site (step 500). In response, the web site requests the computer system to return a hash value—e.g., a hash value derived from the computer system's processor number and a string that corresponds to the web site's URL (step 510). The computer system returns that hash value to the web site (step 520). The web site then sends encrypted content, and an accompanying decryption program, to the computer system (step 530). That decryption program may be embodied in a tamper resistant form—as described in U.S. Pat. No. 5,892,899, issued Apr. 6, 1999 and assigned to this application's assignee.

In this embodiment of the present invention, the decryption program includes the hash value that had been returned by the computer system (i.e., the "expected hash value"), and code (also embodied in a tamper resistant form) that performs periodic platform identity checks, as that program is executed. In a preferred embodiment, that code periodically invokes an instruction that causes the expected hash value to be compared with a hash value derived from the key (e.g., the string corresponding to the URL for the web site that delivered the encrypted content) and the processor number for the platform that currently executes the program (step 540). If the hash values match, the platform continues to execute the program (step 550). If the hash values do not match, suggesting that the program was improperly copied from the system that initially received it to another system, the program can discontinue execution (step 560).

By including in the decryption program, code that periodically invokes the hash value comparison function described above, execution of that program can be tied to the platform that initially received the program and the accompanying encrypted content. By embodying that code in tamper resistant form, a user should not be able to determine when such periodic checks occur, making it very difficult for a user to copy the program over to another system. In addition, if a ring 3 instruction is used to perform such periodic checks, no system call is required, which, unlike a ring 0 instruction, ensures that rogue software cannot intercept an inter-privilege call.

Although the foregoing description has specified a preferred embodiment of a method and apparatus for identifying a computer system, while preserving user privacy, those skilled in the art will appreciate that many modifications and substitutions may be made. For example, the processor number may be replaced by another identifier that identifies a computer system. A key other than a string that corresponds to an URL may be used. Applications other than applications delivered from web sites may request computer system identification. For example, such requests may be delivered to a computer system via a local area network (LAN). In addition, applications to be executed on licensed platforms only may use this method and apparatus to bind execution to licensed systems. Although presented in the context of a download from a web site, the encrypted content and the decryption program may be delivered to the platform in other ways, e.g., via delivery of a self-contained storage device (e.g., floppy disc, CD-ROM, DVD-ROM, etc . . . ). Similarly, although presented in the context of binding content to a specific platform, the method and apparatus of the present invention may be used to authenticate computer systems for other purposes. Accordingly, it is intended that these and all other modifications, alterations, substitutions and additions be considered to fall within the spirit and scope of the invention as defined by the appended claims.

What is claimed is:

1. A microprocessor comprising:
   an identifier that identifies the microprocessor;
   embedded instructions that comprise microcode for comparing a hash value, derived from the identifier and a key, to an expected hash value; and embedded instructions that comprise microcode for producing a hash value that is a function of the identifier and a key.

2. The microprocessor of claim 1 wherein the identifier comprises a processor number.

* * * * *